Figure 1:
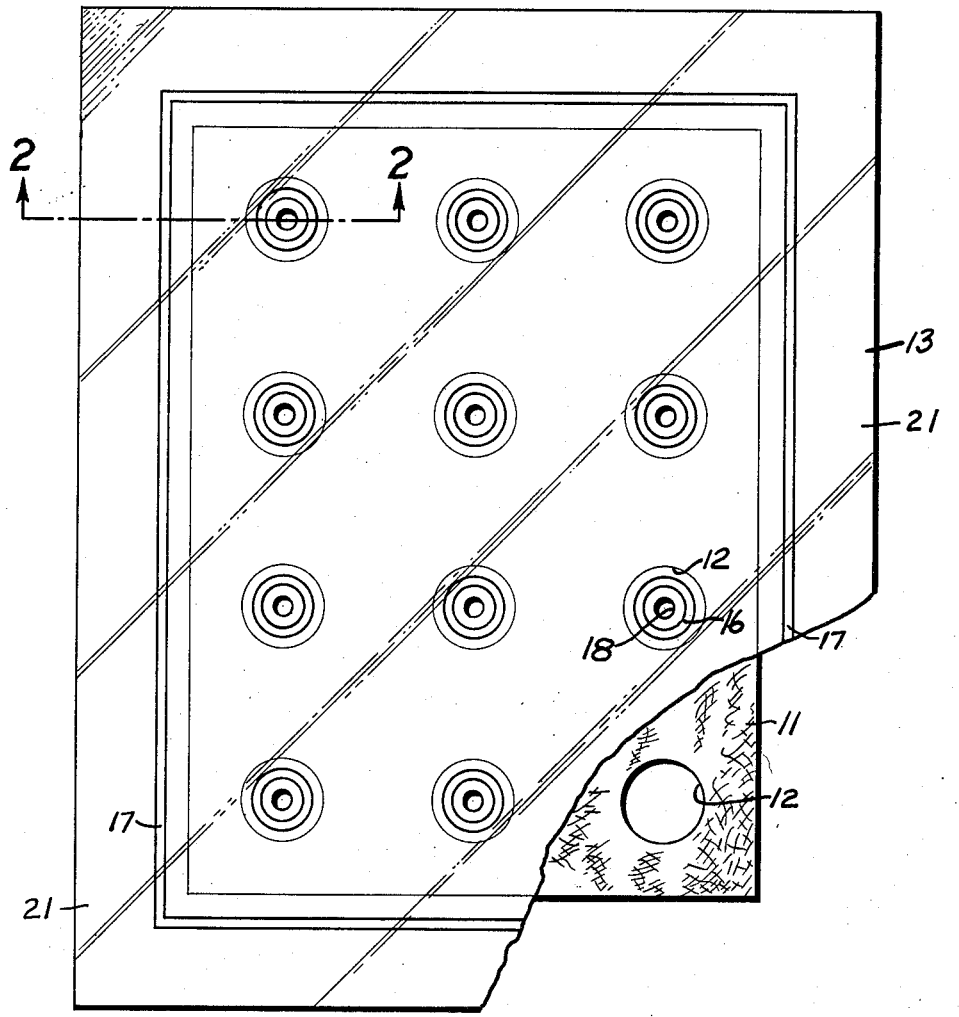

Feb. 19, 1957 R. S. ROGERS 2,781,820
PROCESS FOR THE PRODUCTION OF INSULATING
LAMINATES AND PRODUCT
Filed Aug. 5, 1953

INVENTOR.
Robert S. Rogers
BY
ATTORNEYS.

United States Patent Office 2,781,820
Patented Feb. 19, 1957

2,781,820

PROCESS FOR THE PRODUCTION OF INSULATING LAMINATES AND PRODUCT

Robert Stanley Rogers, Greenwich, Conn., assignor to Celanese Corporation of America, New York, N. Y., a corporation of Delaware Application August 5, 1953, Serial No. 372,512

12 Claims. (Cl. 154—28)

This invention relates to laminated articles and relates more particularly to laminated articles having good heat-insulating properties.

It is an object of this invention to provide a novel heat-insulating and buoyant laminate.

Another object of this invention is the provision of a new heat-insulating laminate suitable for use as a lining for garments, which laminate will impart the property of buoyancy in water to said garments, and which laminate will also provide adequate ventilation so as to avoid discomfort to the wearer of said garments.

A further object of this invention is to provide a novel, efficient and economical method for the production of heat-insulating materials.

Other objects of this invention will be apparent from the following detailed description and claims.

According to this invention there is provided a laminate comprising a fibrous batting having a plurality of spaced apertures therethrough, and a layer of a water-impermeable film on each side of said batting, said layers being sealed to each other at said apertures. More particularly, the layers of film have a plurality of spaced holes in register with the apertures in the batting while the layers of film are sealed to each other around each of said holes. The layers of film are also sealed to each other around the periphery of the batting whereby the batting is enclosed within a water-impermeable envelope. Desirably, at least one of the layers of film has a portion extending beyond said peripheral seal to provide an area for stitching the laminate to a garment without puncturing said water-impermeable envelope.

By virtue of the construction of the present invention the batting is prevented from shifting and separating within the envelope formed by the layers of film, and the entire laminate may be immersed in water without causing the batting to become wet and thereby lose its heat-insulating properties. This is in contrast to other constructions in which shifting of the batting is prevented by stitching, e. g. quilting, which allows water to enter the batting easily on immersion. Furthermore, in the laminate of the present invention, the film, which maintains the batting dry at all times, causes no discomfort to the wearer of a garment containing said laminate, since the holes in the film permit ventilation so that body moisture may travel through the laminate. In addition, the laminate of this invention provides buoyancy, because of the mass of air completely confined within the envelope formed by the two layers of film, which confined mass of air enhances the heat-insulating properties of the laminate. Accordingly, the laminate of this invention forms an excellent lining for garments such as hats, coats, trousers or boots. When so used, it keeps the wearer of the garment warm and comfortable, helps to maintain the wearer afloat if and when he is immersed in water, and retains its insulating properties after such immersion.

For best results, polyethylene film is employed as the water-impermeable film in the laminate of the present invention. However, other suitable films, such as films made of polyvinyl esters or cellulose esters or other organic derivative of cellulose, may be employed if desired. Preferably, the film should be of the heat-sealable type, since the seals in the laminate of this invention are made best by the use of heat.

With respect to the batting employed in the laminate of the present invention, optimum results are attained when this batting is made of cellulose acetate fibers, for example a batting formed by carding a mass of staple cellulose acetate fibers. Preferably, the batting is one which has been treated on one or both sides to improve the cohesion of the fibers thereof, e. g. by applying water to a surface of said batting and subjecting the wetted batting to the combined action of heat and pressure to cause softening and coalescence of at least a portion of the surface fibers. However, battings which have not been so treated may also be employed. Battings made of fibers other than cellulose acetate may be employed, e. g. fibers of other organic derivatives of cellulose, synthetic linear polyamide condensation products, polymeric vinyl halides, or polyacrylonitriles.

The size and spacing of the apertures in the batting may be varied, but preferably these apertures are about 1 to 2½ inches in diameter and are spaced apart about 3 to 12 inches. Similarly, the size of the holes in the film may vary, a suitable size being from about ¼ to ½ inch in diameter. The width of the seal in the films should range from about 3/16 to ½ inch, while the diameter of the seal should be almost equal to the diameter of the apertures in the batting to keep the batting from shifting during use.

The laminate of this invention is advantageously produced by a process which comprises the steps of providing a fibrous batting, applying a layer of the film to each side of said batting, sealing the two layers of film together at portions of said film in register with apertures in said batting, providing spaced holes within said sealed portions, and sealing said layers of film around the circumference of said batting.

The apertures in the batting are preferably provided before the film is applied to the batting. Thus, these apertures may be formed in a continuous batting in any suitable manner, as, for example, by punching, cutting or melting spaced portions of said batting. The layers of film may be applied to the batting in the form of two separate sheets of film or in the form of a single sheet of film folded at or near its center, the batting being enclosed within the two halves of said folded sheet.

The sealing of the layers of film is preferably carried out under the action of heat and pressure, for example, by the application of a heated sealing tool or by "electronic" sealing, in which the portions of the films to be sealed are heated by means of a high frequency electric field. The operation of sealing the layers of film at the apertures in the batting is advantageously carried out before, or at the same time as, the registering holes are formed in said layers of film. However, if desired, the holes may be formed in the layers of film before this sealing operation is carried out, and even before said layers are applied to the batting. The seal at the apertures in the batting may be linear, e. g. in the form of a closed curve, such as the circumference of a circle, or it may be in the form of a spot or area. For example, each seal may cover the entire area of a circle and the hole in the layers of film may be punched, melted or otherwise formed, at the center of this area.

Figure 2:
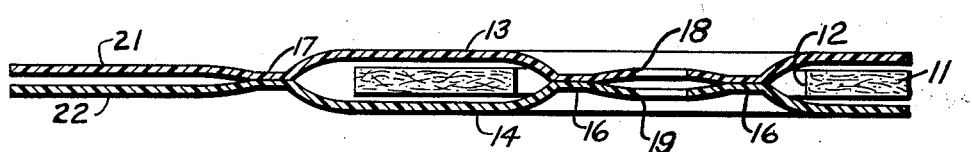

A preferred embodiment of this invention is shown in the accompanying drawing, in which Fig. 1 is a plan view, with a portion broken away, of the laminate of this invention, the apertures and holes being shown on an exaggerated scale in the interest of clarity, and Fig. 2 is a cross-sectional view along the line 2—2 in Fig. 1.

Referring now to the drawing, reference numeral 11 designates a batting of cellulose acetate fibers, said batting having spaced circular apertures 12 extending therethrough. The batting 11 is enclosed within an envelope formed by an upper layer of transparent polyethylene film 13 and a lower layer of transparent polyethylene film 14, which layers are electronically sealed together along circular lines 16 through the apertures 12 and along a line 17 extending peripherally around the batting 11. The layers 13 and 14 have ventilating holes 18 and 19, respectively, formed therein within the circular seals 16, while marginal portions 21 and 22 of said layers extend beyond the circumferential seal 17. The laminate may be attached to a garment by means of stitching (not shown) passing through the marginal portions 21 and 22.

It is to be understood that the foregoing detailed description is given merely by way of illustration and that many variations may be made therein without departing from the spirit of my invention.

Having described my invention what I desire to secure by Letters Patent is:

1. An insulating laminate comprising a fibrous batting having a plurality of spaced apertures therethrough, and a layer of a water-impermeable film on each side of said batting, said layers having a plurality of spaced holes in register with said apertures and said layers being sealed to each other around each of said holes.

2. An insulating laminate comprising a fibrous batting having a plurality of spaced apertures therethrough, and a layer of a water-impermeable film on each side of said batting, said layers having a plurality of spaced holes in register with said apertures, said layers being sealed to each other around each of said holes, and said layers being sealed to each other around the periphery of said batting whereby said batting is enclosed within a water-impermeable envelope.

3. An insulating laminate comprising a fibrous batting having a plurality of spaced apertures therethrough, and a layer of a water-impermeable film on each side of said batting, said layers having a plurality of spaced holes in register with said apertures, said layers being sealed to each other around each of said holes, and said layers being sealed to each other around the periphery of said batting whereby said batting is enclosed within a water-impermeable envelope, at least one of said layers having a portion extending beyond said peripheral seal to provide an area for stitching said laminate to a garment without injuring said envelope.

4. An insulating laminated lining for a garment, said lining comprising a fibrous batting having a plurality of spaced apertures therethrough, and a layer of a water-impermeable film on each side of said batting, said layers having a plurality of spaced holes in register with said apertures, said layers being sealed to each other around each of said holes, and said layers being sealed to each other around the periphery of said batting whereby said batting is enclosed within a water-impermeable envelope, at least one of said layers having a portion extending beyond said peripheral seal, and stitching passing through said extending portion for uniting said laminated lining to the main body of said garment.

5. An insulating laminate comprising a fibrous cellulose acetate batting having a plurality of spaced apertures therethrough, and a layer of a water-impermeable polyethylene film on each side of said batting, said layers being sealed to each other at said apertures.

6. An insulating laminate comprising a fibrous cellulose acetate batting having a plurality of spaced apertures therethrough, and a layer of a water-impermeable polyethylene film on each side of said batting, said layers having a plurality of spaced holes in register with said apertures, and said layers being sealed to each other around each of said holes.

7. An insulating laminate comprising a fibrous cellulose acetate batting having a plurality of spaced apertures therethrough, and a layer of a water-impermeable polyethylene film on each side of said batting, said layers being sealed to each other at said apertures, and said layers being sealed to each other around the periphery of said batting whereby said batting is enclosed within a water-impermeable envelope.

8. An insulating laminate comprising a fibrous cellulose acetate batting having a plurality of spaced apertures therethrough, and a layer of a water-impermeable polyethylene film on each side of said batting, said layers having a plurality of spaced holes in register with said apertures, said layers being sealed to each other around each of said holes, and said layers being sealed to each other around the periphery of said batting whereby said batting is enclosed within a water-impermeable envelope.

9. An insulating laminate comprising a fibrous cellulose acetate batting having a plurality of spaced apertures therethrough, and a layer of a water-impermeable polyethylene film on each side of said batting, said layers having a plurality of spaced holes in register with said apertures, said layers being sealed to each other around each of said holes, and said layers being sealed to each other around the periphery of said batting whereby said batting is enclosed within a water-impermeable envelope, at least one of said layers having a portion extending beyond said peripheral seal to provide an area for stitching said laminate to a garment without injuring said envelope.

10. An insulating laminated lining for a garment comprising a fibrous cellulose acetate batting having a plurality of spaced apertures therethrough, and a layer of a water-impermeable polyethylene film on each side of said batting, said layers having a plurality of spaced holes in register with said apertures, said layers being sealed to each other around each of said holes, and said layers being sealed to each other around the periphery of said batting whereby said batting is enclosed within a water-impermeable envelope, at least one of said layers having a portion extending beyond said peripheral seal, and stitching passing through said extending portion for uniting said laminated lining to the main body of said garment.

11. Process for the production of insulating laminates, which comprises applying to each side of a fibrous batting, having spaced apertures therein, a layer of water-impermeable film having spaced holes in register with said apertures in said fibrous batting, and sealing the two layers of film together within said apertures and around said holes.

12. Process for the production of insulating laminates, which comprises applying to each side of a fibrous batting, having spaced apertures therein, a layer of water-impermeable film having spaced holes in register with said apertures in said fibrous batting, and sealing the two layers of film together within said apertures and around said holes and also around the periphery of said batting.

References Cited in the file of this patent

UNITED STATES PATENTS

| | | |
|---|---|---|
| 1,595,006 | Kelley et al. | Aug. 3, 1926 |
| 1,970,802 | Johnson | Aug. 21, 1934 |
| 2,269,342 | Johnson | Jan. 6, 1942 |
| 2,538,899 | Dodge et al. | Jan. 23, 1951 |
| 2,608,690 | Kolb et al. | Sept. 2, 1952 |
| 2,620,493 | Brelsford | Dec. 9, 1952 |
| 2,622,053 | Clowe et al. | Dec. 16, 1952 |
| 2,633,441 | Buttress | Mar. 31, 1953 |
| 2,649,859 | Hermanson et al. | Aug. 25, 1953 |

FOREIGN PATENTS

| | | |
|---|---|---|
| 1,042,479 | France | June 3, 1953 |